US012194961B2

(12) United States Patent
Kim

(10) Patent No.: US 12,194,961 B2
(45) Date of Patent: Jan. 14, 2025

(54) CONSOLE FOR VEHICLE

(71) Applicants: Hyundai Motor Company, Seoul (KR); Kia Corporation, Seoul (KR)

(72) Inventor: Min Han Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 260 days.

(21) Appl. No.: 17/874,493

(22) Filed: Jul. 27, 2022

(65) Prior Publication Data

US 2023/0234514 A1 Jul. 27, 2023

(30) Foreign Application Priority Data

Jan. 21, 2022 (KR) ........................ 10-2022-0009167

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC .... B60R 7/04; B60R 7/10; B60R 7/08; B60R 11/00; B60R 11/04; B60R 5/02; B60R 2011/0007; B60R 13/0262
USPC .............. 296/1.07, 24.34, 37.8, 37.14, 24.33
See application file for complete search history.

(56) References Cited

U.S. PATENT DOCUMENTS

| 6,588,821 B2* | 7/2003 | Worrell | B60N 3/102 |
| | | | 224/400 |
| 6,663,155 B1* | 12/2003 | Malone | B60R 11/0229 |
| | | | 224/539 |
| 7,240,814 B2* | 7/2007 | Holmberg | B60R 7/005 |
| | | | 220/529 |
| 7,513,007 B2* | 4/2009 | Chernoff | A47L 5/24 |
| | | | 62/331 |
| 9,283,890 B1 | 3/2016 | Huebner et al. | |
| 10,000,159 B2* | 6/2018 | Hellman | B60R 7/02 |
| 10,232,784 B1* | 3/2019 | Mullen | B62D 25/20 |
| 10,232,785 B1* | 3/2019 | Mullen | B60N 2/5628 |
| 10,232,786 B1* | 3/2019 | Mullen | B60N 3/101 |
| 10,377,317 B2* | 8/2019 | Ranganathan | B60N 2/793 |
| 10,744,918 B2* | 8/2020 | Mullen | B60N 2/793 |
| 2002/0163215 A1* | 11/2002 | Emerling | B60R 7/04 |
| | | | 296/24.34 |
| 2005/0035618 A1* | 2/2005 | Toth | B60N 2/793 |
| | | | 296/24.34 |

(Continued)

FOREIGN PATENT DOCUMENTS

JP    H 8-244535 A    9/1996
JP    H 11-115603 A    4/1999
(Continued)

*Primary Examiner* — Amy R Weisberg
*Assistant Examiner* — Wenwei Zhuo
(74) *Attorney, Agent, or Firm* — Fox Rothschild LLP

(57) ABSTRACT

Provided is a console for a vehicle capable of providing a large storage space and various types of usability in, for example, a high-performance vehicle and reducing costs while securing rigidity of the console and improving an aesthetic effect. The console for a vehicle includes a frame installed on a floor of the vehicle, and a console body mounted on the frame and having at least one article receiving part, wherein the frame is at least partially exposed externally of the console body.

13 Claims, 21 Drawing Sheets

(56) References Cited

U.S. PATENT DOCUMENTS

| | | | |
|---|---|---|---|
| 2007/0296234 A1* | 12/2007 | Sturt | B60R 7/04 296/24.34 |
| 2008/0007079 A1* | 1/2008 | Sturt | B60R 7/04 296/24.34 |
| 2010/0123328 A1 | 5/2010 | Sluis et al. | |
| 2010/0283277 A1* | 11/2010 | Carnevali | B60R 13/0262 296/37.8 |
| 2011/0121596 A1* | 5/2011 | Beyer | B60R 7/04 296/37.8 |
| 2013/0009417 A1* | 1/2013 | Hipshier | B60R 7/04 296/24.34 |
| 2015/0329062 A1* | 11/2015 | Ackeret | B60R 11/02 248/220.22 |
| 2016/0344221 A1* | 11/2016 | Kramer | H02J 7/0044 |
| 2017/0237843 A1* | 8/2017 | Ackeret | B60R 11/0252 455/575.9 |
| 2019/0283680 A1* | 9/2019 | Vican | B60R 7/04 |

FOREIGN PATENT DOCUMENTS

| | | |
|---|---|---|
| JP | 2001-080422 A | 3/2001 |
| KR | 10-2004-0097970 A | 11/2004 |
| KR | 10-0586179 B1 | 7/2006 |
| KR | 10-1990966 B1 | 9/2019 |

\* cited by examiner

CONSOLE FOR VEHICLE

CROSS-REFERENCE TO RELATED APPLICATION(S)

This application is based on and claims under 35 U.S.C. § 119(a) the benefit of Korean Patent Application No. 10-2022-0009167 filed on Jan. 21, 2022 in the Korean Intellectual Property Office, the disclosure of which is incorporated herein by reference in its entirety.

TECHNICAL FIELD

Embodiments of the present disclosure relate to a console for a vehicle applicable to, for example, a high-performance vehicle.

DESCRIPTION OF RELATED ART

In general, a center console box installed on a floor panel between separator seats in a vehicle is known in the art. Such a center console has been widely used for storing simple items of passengers.

The center console may include a core part supporting a cup holder, an arm rest, etc., a mounting bracket for connecting the core part to a vehicle body, and a cover trim surrounding the core part and forming a skin of the console.

However, for example, in an interior of a vehicle configured in the form of a flat floor without a center tunnel, a height of the console also needs to be increased according to a height of a seat, which is directly related to the problem of securing rigidity of the console. In particular, in high-performance vehicles that consider track performance as an important factor, it is necessary to support a driver's legs, so the rigidity of the console is a very important factor.

SUMMARY

An exemplary embodiment of the present disclosure may provide a console for a vehicle capable of providing a large storage space and various types of usability in, for example, a high-performance vehicle and reducing costs while securing rigidity of the console and improving an aesthetic effect.

According to an exemplary embodiment of the present disclosure, a console for a vehicle may include: a frame installed on a floor of the vehicle, and a console body mounted on the frame and having at least one article receiving part, wherein the frame is at least partially exposed externally of the console body.

The frame may include: a pair of frame members; and a connection member connecting the frame member, wherein the frame member may include at least one closed cross-section.

The frame may include: a frame member integrally formed by being bent; and a connection member connecting both ends of the frame member.

The frame may be provided with a mounting bracket for connecting the frame to a vehicle body.

The frame may further include an auxiliary frame member, and the auxiliary frame member may be connected to the frame by a joint adapter.

The auxiliary frame member may be provided with a mounting panel for mounting an accessory.

The auxiliary frame member may be changeable in position on the frame.

The auxiliary frame member may be provided with a moving frame, and the moving frame may include a rail member fixed to the auxiliary frame member, and a slider sliding on the rail member.

The console may further include a tray and a detachable carrier received in or mountable on the frame.

The detachable carrier may include at least one of a handle, a shoulder strap, and a wheel.

An arm rest may be rotatably installed on an upper portion of the detachable carrier to open and close a storage space.

The frame may be provided with an accessory, and the accessory may include at least one of an arm rest, a cushioning member, a fire extinguisher, a camera, a data logger, and a helmet holder.

The console body may include a shift lever.

The console body may include a sliding tray coupled to be accessible to a storage space of the console body through an opening.

An arm rest may be installed on an upper surface of the console body for receiving the sliding tray.

The console body may be formed integrally with a portion of the frame, and the article receiving part of the console body may include a plurality of fixed trays mounted on the frame.

The plurality of fixed trays may include a first fixed tray and a second fixed tray, and an arm rest may be rotatably installed on an upper portion of the second fixing tray to open and close a storage space.

One side surface of the second fixed tray may be provided with a through-hole and a cover member for opening and closing the through-hole, and a mounting panel of the frame positioned in the second fixing tray may be exposed externally through the through-hole, and an accessory is mounted to the mounting panel.

The console body may include a mesh acting as the article receiving part.

In another embodiment, vehicles are provided that comprise the console as disclosed herein.

BRIEF DESCRIPTION OF DRAWINGS

The above and other embodiments, features, and advantages of the present disclosure will be more clearly understood from the following detailed description taken in conjunction with the accompanying drawings, in which.

DETAILED DESCRIPTION

Figure 1:
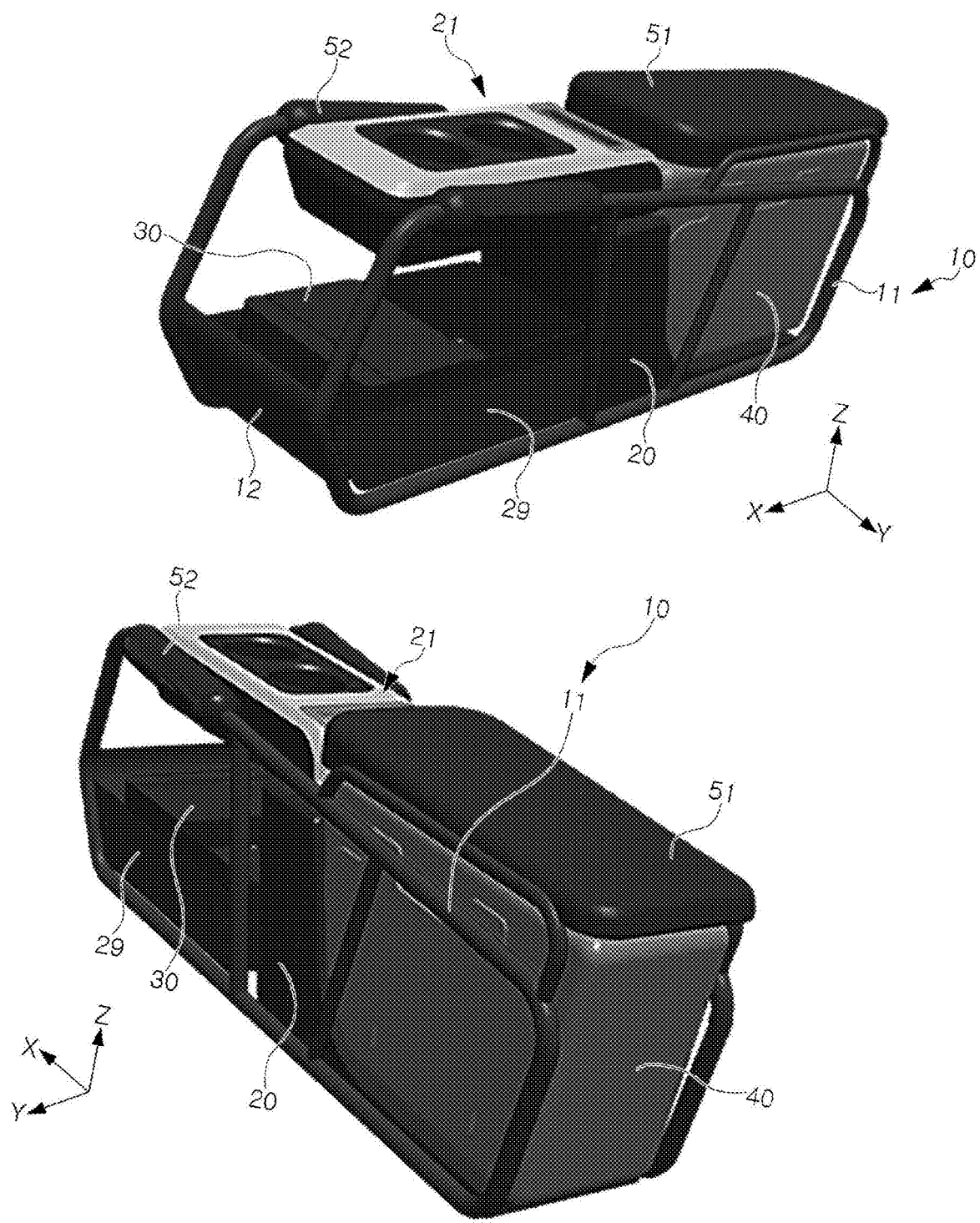
FIG. 1 is a perspective view illustrating a console for a vehicle according to a first exemplary embodiment in the present disclosure.

Hereinafter, exemplary embodiments in the present disclosure will be described in detail with reference to the exemplary drawings. It is to be noted that in giving reference numerals to components of the accompanying drawings, the same components will be denoted by the same reference numerals even though they are illustrated in different drawings.

In the present disclosure, vehicles refer to various vehicles that move a transported object such as a person, an animal, or an object from a departure point to a destination. Such vehicles are not limited to vehicles driving on roads or tracks.

In addition, the terms "upper", "left and right", "side", "front and rear", "front", "rear", and the like used in relation to a direction are defined based on a vehicle or a vehicle body, that is, an installation object.

In the present disclosure, the terms such as first and second may be used to describe various components, but the terms such as the first and second do not limit the order, size, location, and importance of these components, and are named only for the purpose of distinguishing one component from another.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Figure 2:
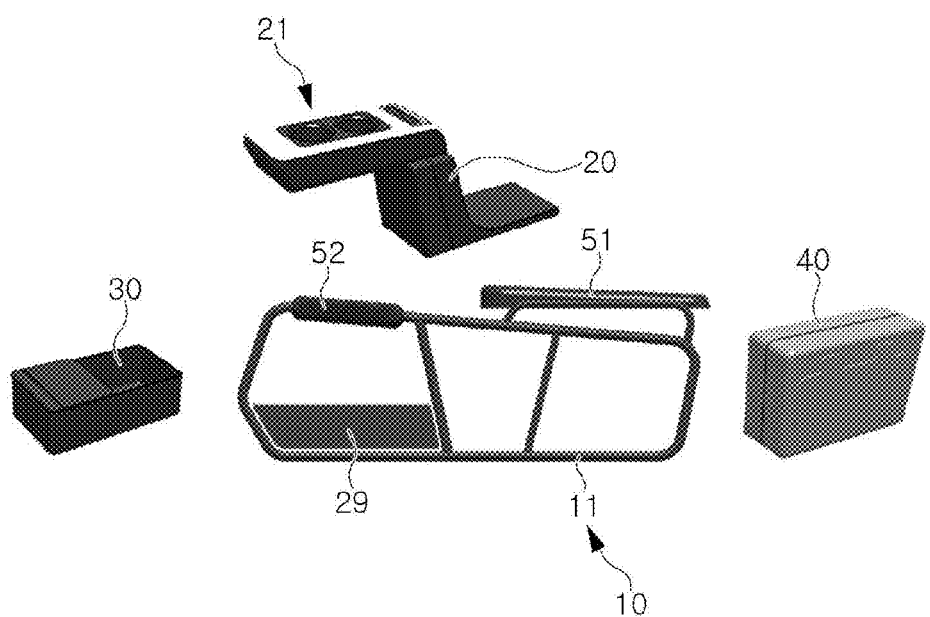
FIG. 2 is an exploded view of the console for a vehicle according to the first exemplary embodiment in the present disclosure.

FIG. 1 is a perspective view illustrating a console for a vehicle according to a first exemplary embodiment in the present disclosure, and FIG. 2 is an exploded view of the console for a vehicle according to the first exemplary embodiment in the present disclosure. FIGS. 3A to 3E are diagrams illustrating various examples of a frame.

The console for a vehicle according to the first exemplary embodiment in the present disclosure may include a frame 10 and a console body 20.

Figure 3A:
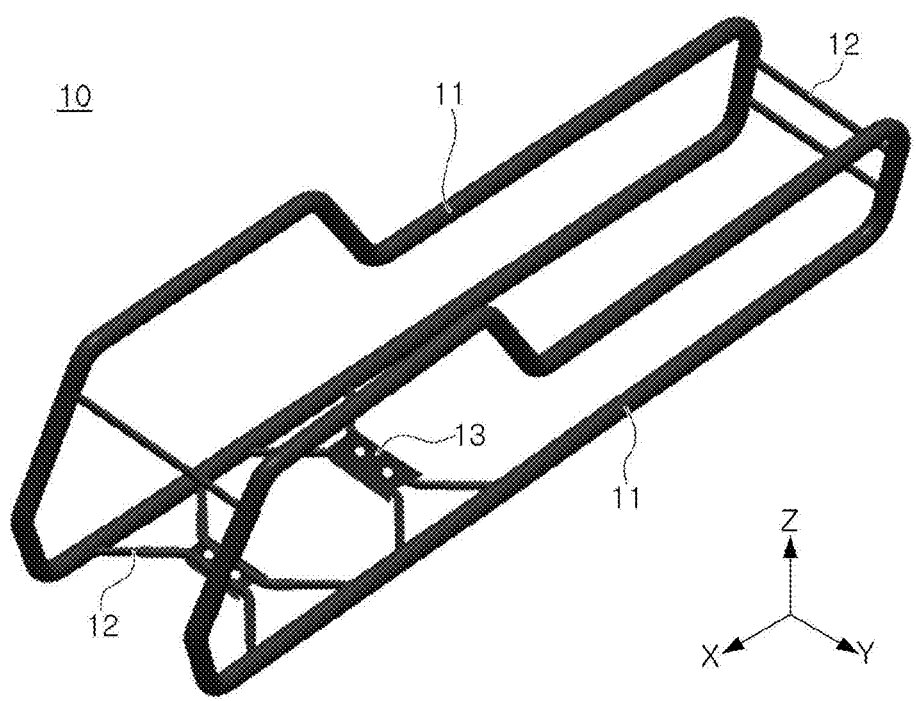
FIGS. 3A to 3E are diagrams illustrating various examples of a frame.
Figure 3B:
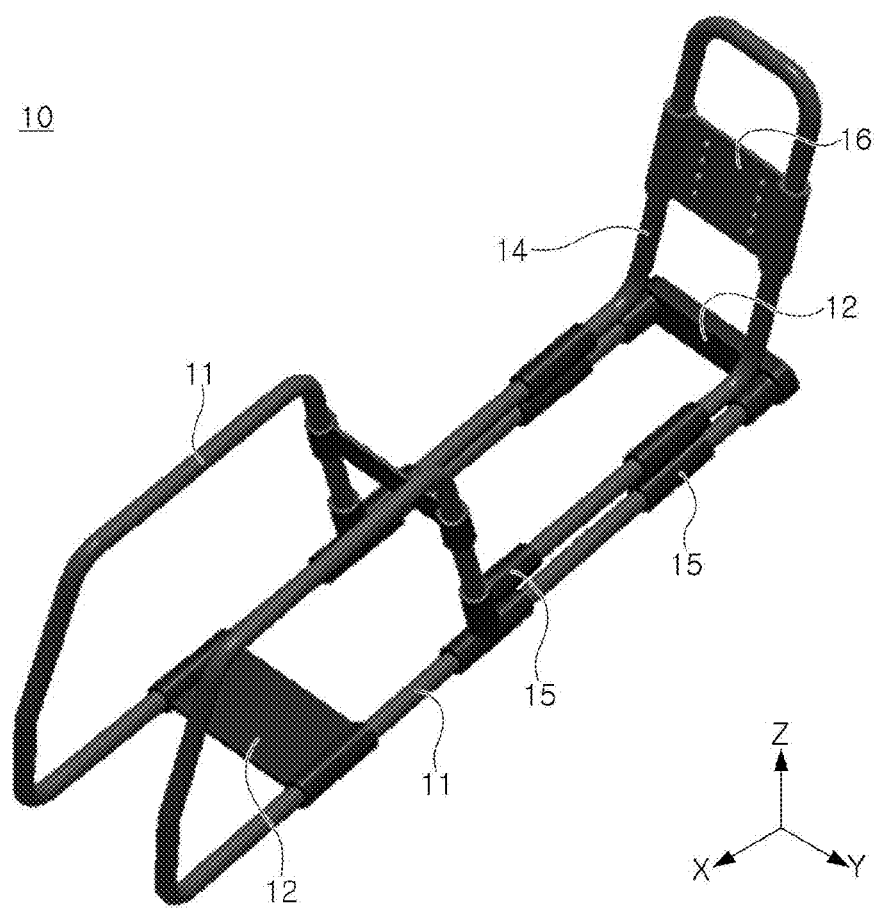

The frame 10 may include a pair of frame members 11 disposed on the left and right in a width direction Y of the console, and a connection member 12 connecting these frame members (see FIGS. 3A and 3B).

The pair of frame members 11 may be formed identically to each other, and may be disposed symmetrically. Each frame member may have at least one closed cross-section.

The frame member 11 may be formed of, for example, a tube member made of a metal material such as stainless steel, but a material and shape of the frame member are not necessarily limited thereto.

The connection member 12 may be formed in various forms, such as a panel, a bracket, a tube, a rod, or a member having an arbitrary shape. In addition, both ends of the connection member may be coupled or assembled to the frame member 11 by welding, bolting, fitting, or the like.

The connection member 12 may be preferably formed of a relatively strong material such as metal or plastic. In addition, in the case of being coupled by welding, the material of the connection member may be selected in consideration of weldability with the frame member 11.

Figure 3C:
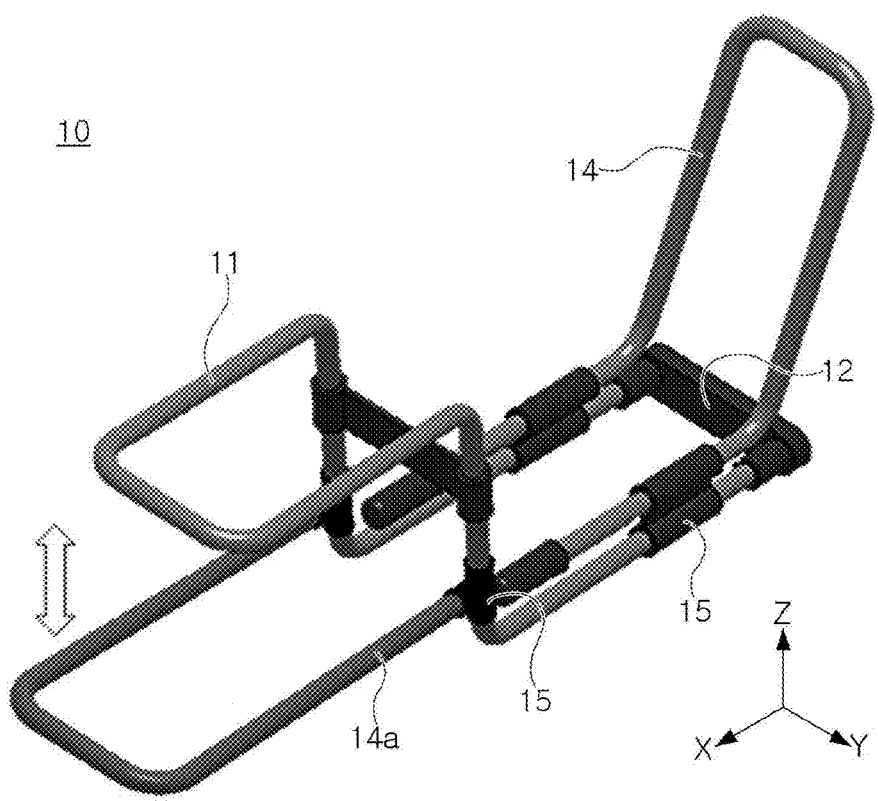
Figure 3D:
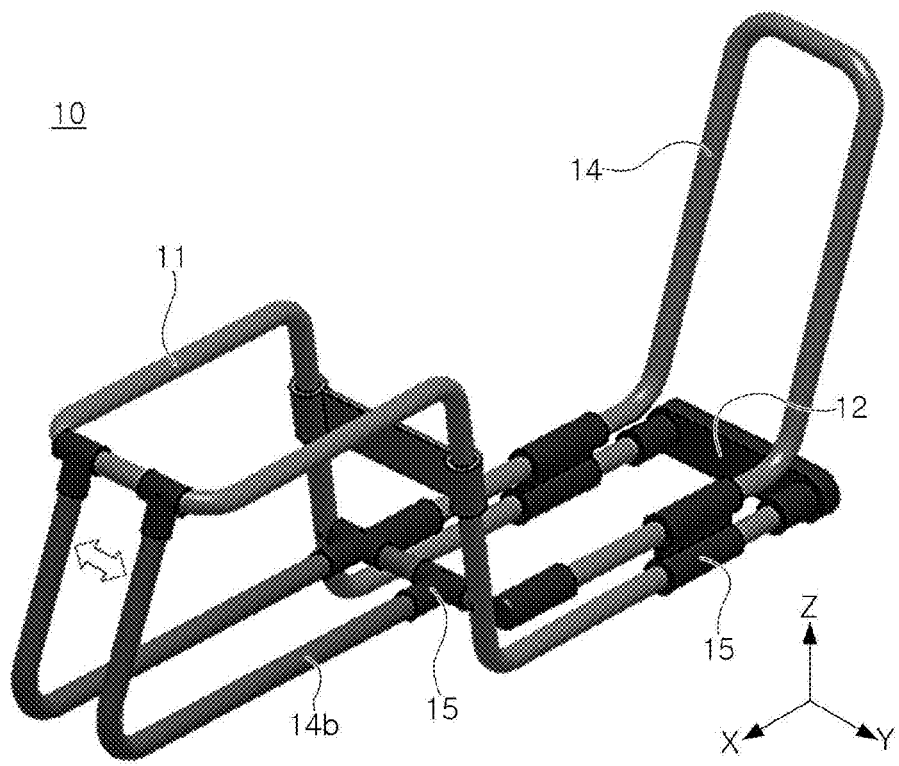
Figure 3E:
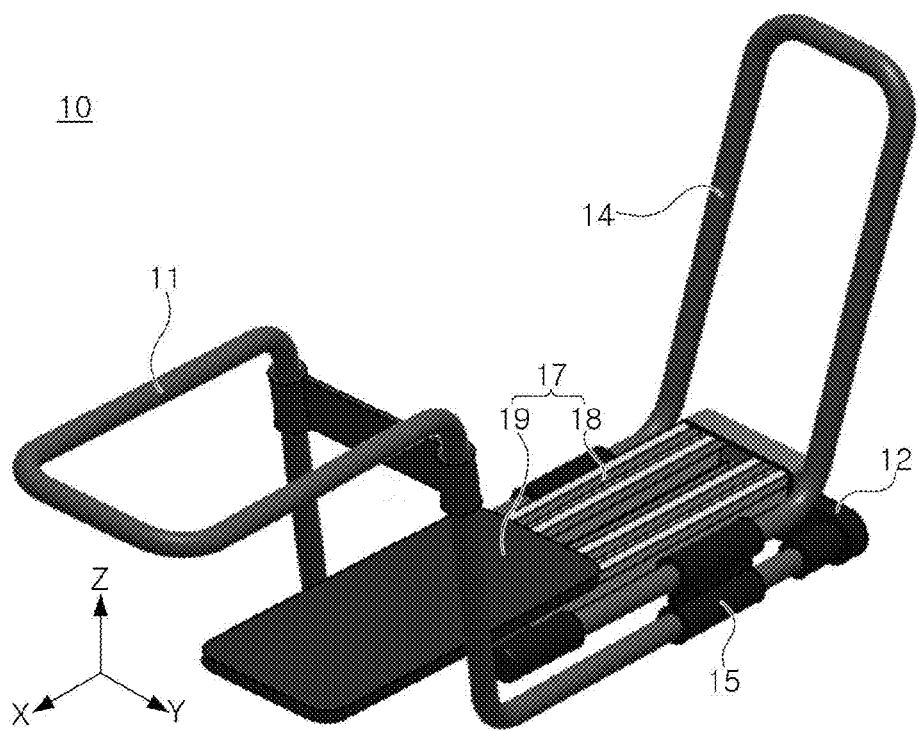

Alternatively, the frame 10 may include a frame member 11 formed by being bent several times, and a connection member 12 connecting both ends of the frame member (see FIGS. 3C to 3E).

For example, the frame member 11 extending in a longitudinal direction X of the console is bent in a first direction (e.g., clockwise) toward a height direction Z, bent in a second direction (e.g., counterclockwise) opposite to the first direction toward the longitudinal direction, and then again bent in the first direction toward a width direction. Thereafter, the frame member is bent in the first direction toward the longitudinal direction, bent in a first direction toward a height direction, and then bent in a second direction toward the longitudinal direction.

In this way, the frame member 11 has a shape bent several times and may be integrally formed. The integrally formed frame member may have an opened cross-section.

As described above, the connection member 12 may be formed in various forms, such as a panel, a bracket, a tube, a rod, or a member having an arbitrary shape. In addition, both ends of the connection member 12 may be coupled or assembled to the frame member 11 by welding, bolting, fitting, or the like.

The frame 10 configured in this way may be installed to the floor panel 1 between separate seats in the vehicle by bolting, welding, or the like, for example. To this end, that is, in order to connect the frame to the vehicle body, the frame may be provided with a mounting bracket 13. For example, a bolt hole may be formed in the mounting bracket for bolting.

The frame 10 may further include an auxiliary frame member 14 (see FIGS. 3B to 3E). This auxiliary frame member may firmly and stably support a tray 30 or a detachable carrier 40 to be described later.

The auxiliary frame member 14 may have a shape bent several times and may be integrally formed. The integrally formed auxiliary frame member may have an opened cross-section. The auxiliary frame may have a material, dimension, shape, etc. different from that of the frame member 11.

FIG. 3B illustrates an example in which the auxiliary frame member 14 is connected to the frame member 11 by a joint adapter 15. In addition, in the frame 10 illustrated in FIG. 3B, it may be seen that various types of joint adapters are applied to the frame member, and a mounting panel 16 capable of mounting various accessories is provided in the auxiliary frame member.

FIGS. 3C and 3D illustrate an example in which a plurality of auxiliary frame members 14 are connected to the frame member 11. For example, FIG. 3C illustrates an auxiliary frame member 14a whose height may be adjusted, and FIG. 3D illustrates an auxiliary frame member 14b whose spacing or position in a width direction may be changed.

As such, the positions of the auxiliary frame members 14a and 14b may be changed on the frame member 11, so that it is possible to change a space in the frame 10 and change a mounted cover trim, and increase the usability of the frame and the console.

FIG. 3E illustrates an example in which a moving frame 17 is mounted together with the auxiliary frame member 14. The moving frame may include a rail member 18 fixed to the auxiliary frame member, and a slider 19 sliding on the rail member.

As such, since the frame 10 further includes the moving frame 17 together with the frame member 11 and the auxiliary frame member 14, there is an advantage in that the functionality of the tray seated on the moving frame may be expanded.

The console body 20 may be mounted on or within the frame 10 and may have at least one article receiving part 21, and may partition a space together with the frame if necessary. This console body may be mounted on and assembled to the frame by bolting, latching, clamping, or the like.

Referring to FIGS. 1 and 2, the article receiving part 21 of the console body 20 may include a cup holder and a storage space (not illustrated) partitioned under the cup holder. In this case, the cup holder may serve as a cover for the storage space.

The console body 20 may be formed of a solid material such as a metal such as steel, or plastic such as PA or PVC, but is not necessarily limited thereto.

Figure 4A:
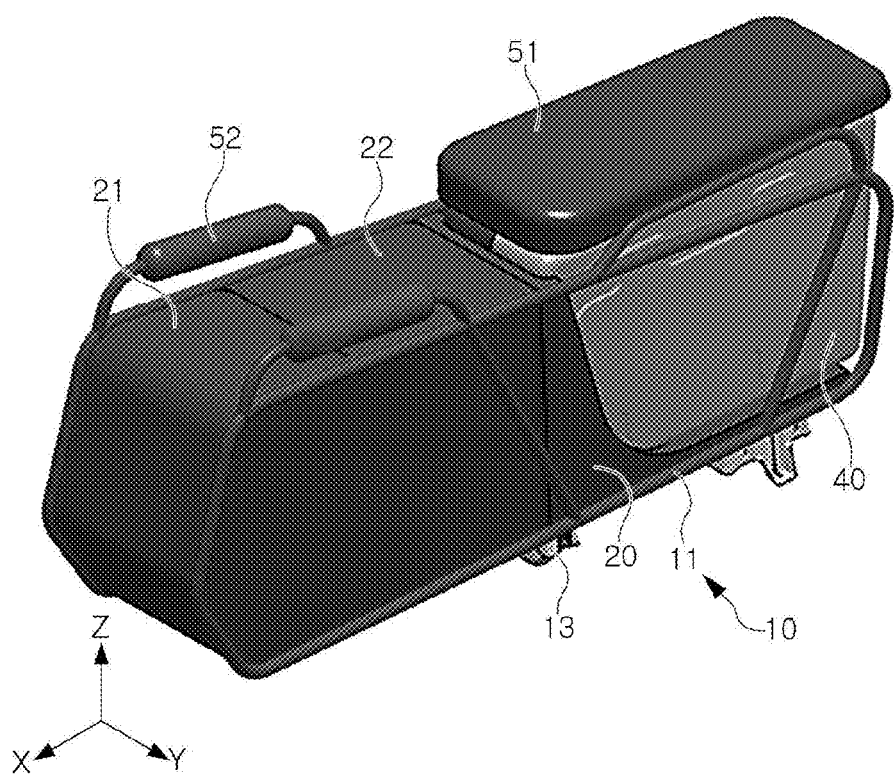
FIGS. 4A and 4B are diagrams illustrating various modified examples of a console body.
Figure 4B:
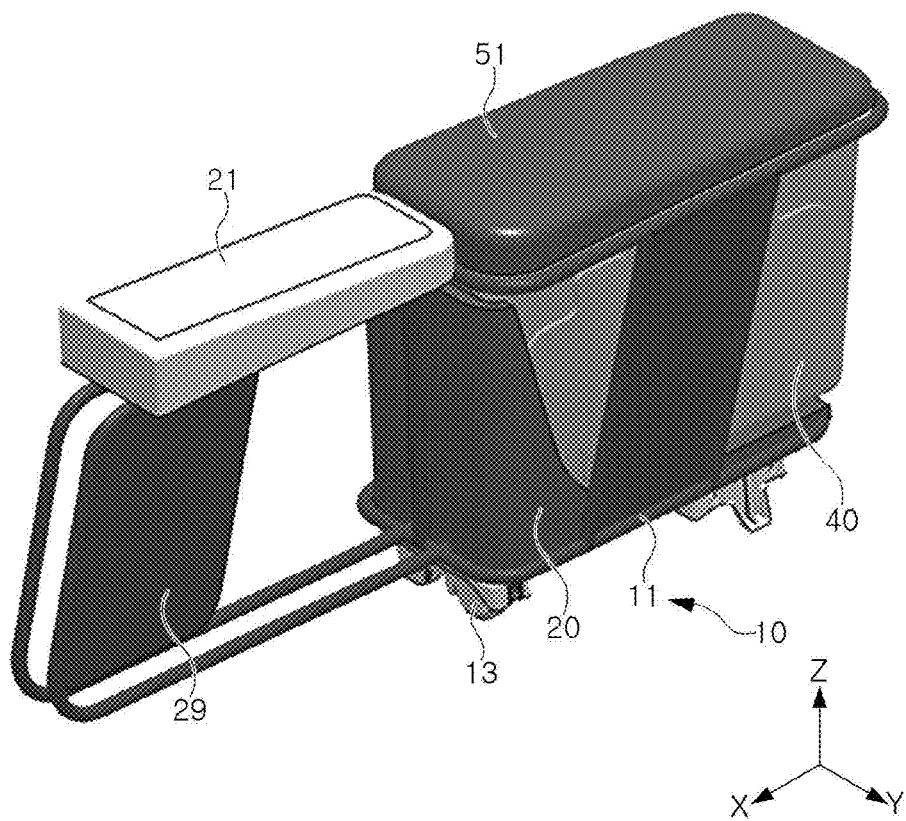

The console body 20 may be implemented in various forms. FIGS. 4A and 4B are diagrams illustrating various modified examples of a console body.

FIG. 4A illustrates an example in which the console body 20 is formed in a substantially box shape. In this case, the article receiving part 21 may be configured as a box-shaped body, and the cover 22 may be provided on an upper portion of a box-shaped body.

FIG. 4B illustrates an example in which the console body 20 is formed in a substantially block shape. The article receiving part 21 may be formed as the storage space for wireless charging. Such a console body may be electrically connected to a battery of the vehicle, and may additionally include a USB port or the like.

As described above, the console body 20 may be disposed in the space within the frame 10, so the frame may be at least partially exposed externally of the console body.

The console for a vehicle according to the first exemplary embodiment in the present disclosure may further include a tray 30 and a detachable carrier 40 that may be received in or mounted on the frame 10.

Referring back to FIGS. 1 and 2, the tray 30 may be mounted on or detachably coupled to a space on one side of the frame 10. The tray may receive various articles by having a predetermined storage space therein. To this end, the tray may be formed in a substantially box shape whose upper surface is opened.

The tray 30 may be seated in place in a space partitioned by the frame member 11 and the connection member 12 of the frame 10. Moreover, the tray may be prevented from swinging or moving within the frame by, for example, a screen 29 installed on the frame member, any panel, or the like.

In the case of the high-performance vehicle, the tray 30 may receive, for example, racing gloves or shoes.

The detachable carrier 40 may be mounted on or detachably coupled to the space on the other side of the frame 10. The detachable carrier may also have a predetermined storage space therein to receive various articles. Such a detachable carrier may be formed of a material such as metal, plastic, or fabric, and may be configured to be opened and closed.

The detachable carrier 40 may be seated in place in a space partitioned by the frame member 11 and the connection member 12 of the frame 10, and may be carried by a passenger outside a vehicle. To this end, the detachable carrier may include a handle 41, a shoulder strap, a wheel 42, and the like. In addition, the detachable carrier may be replaced with a bag of a predetermined shape.

In the case of the high-performance vehicle, the detachable carrier 40 may receive, for example, various clothing required for racing, or safety device such as a balaclava and hans.

In the console for a vehicle according to the first exemplary embodiment in the present disclosure, since the tray 30 and the detachable carrier 40 are not integrated with the frame 10 or the console body 20 but are detachable from the frame 10 or the console body 20, the tray 30 and the detachable carrier 40 may be easily attached and detached as needed, thereby having an effect of being selectively used.

Figure 5:
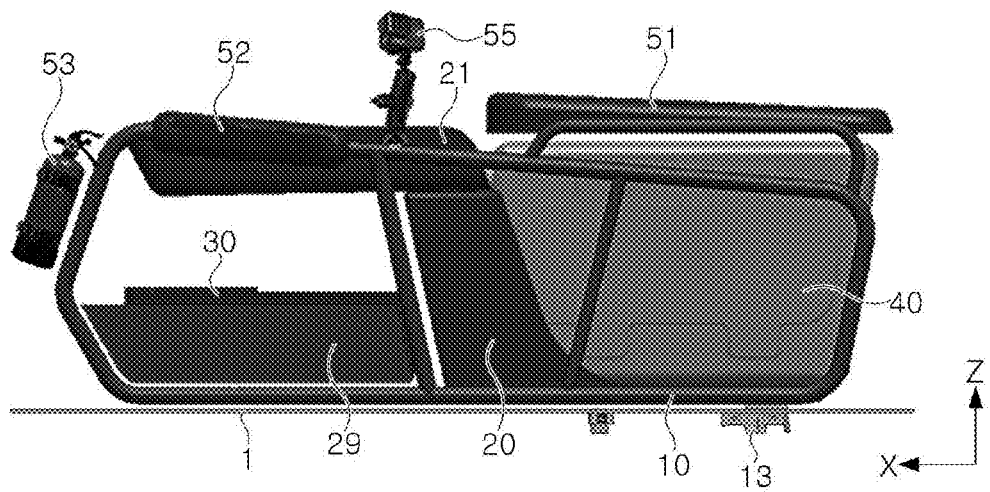
FIGS. 5 and 6 are diagrams illustrating an example in which accessories are mounted on the console for a vehicle according to the first exemplary embodiment in the present disclosure.
Figure 6:
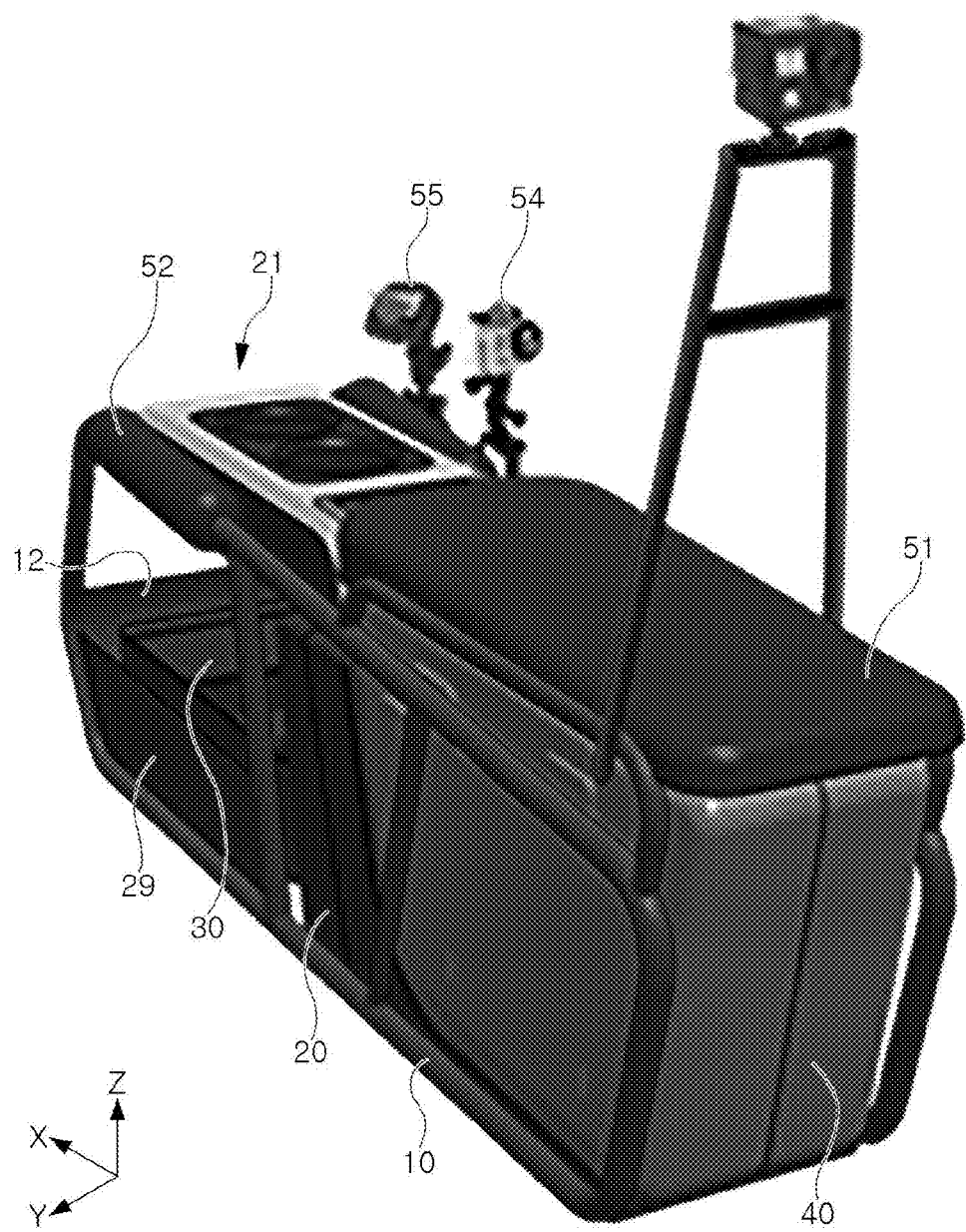

FIGS. 5 and 6 are diagrams illustrating an example in which accessories are mounted on the console for a vehicle according to the first exemplary embodiment in the present disclosure.

Accessories of the console for a vehicle may include an arm rest 51, a cushioning member 52, a fire extinguisher 53, a camera 54, a data logger 55, a helmet holder 56, and the like.

The console of embodiments of the present disclosure may employ the structure of the frame 10 exposed from the console body 20, so basic parts for storage such as a normal article receiving part 21, a tray 30, and a detachable carrier 40 and various accessories may be easily mounted.

In particular, as long as there is a free space on the frame 10 on both sides and rear surface of the console, various holders, mounting panels, or the like for mounting accessories may be installed, so diversity and ease of installation of accessories may be maximized.

According to the console for a vehicle according to the first exemplary embodiment in the present disclosure, it is possible to obtain an effect of increasing the storage space and usability in, for example, the high-performance vehicle and reducing costs while securing an aesthetic design.

Above all, a large-capacity storage space may be secured by disposing the frame 10 acting as an exoskeleton on the outside of the console body 20. In other words, in the console of embodiments of the present disclosure, since the frame is disposed on the outside of the console body, a core part inside the console body may be unnecessary, and thus, it will be possible to further increase the capacity of the console body and the capacity of the storage space that may be partitioned throughout the console.

For example, in an interior of a vehicle configured in the form of a flat floor, there is an advantage in that walk-through may be improved and a floor with a sense of unity may be formed, whereas since a center tunnel is omitted, there is also a fatal disadvantage in that indoor articles may flow into a driver's seat while the vehicle is driving and thus may be a threat to pedal operation. In particular, in a high-performance vehicle in which lateral acceleration is strongly applied and intense driving is performed, this disadvantage becomes more prominent.

The console of embodiments of the present disclosure may be disposed between the separate seats in the vehicle and the frame 10 is fixedly installed on the floor panel 1, so it is possible to block the inflow of an article from side or rear seats into the driver's seat through at least a floor. When the screen 29 is added to the frame, it is possible to further improve the effect of blocking the inflow of the article.

In addition, since the console of embodiments of the present disclosure may be made of a material having suitable rigidity, such as metal or plastic, it is possible to secure rigidity for supporting a passenger's body, particularly legs, by the lateral acceleration generated during the intense driving.

For example, by disposing the cushioning member 52 in an area where a knee may reach in the frame 10 of the console, the passenger's legs may be comfortably seated. In other words, a high console requires strong rigidity to perform a function of supporting the passenger's body as well as luxury. The console of embodiments of the present disclosure may have the frame exposed externally of the console body 20 and firmly fixed to the floor panel 1, and thus, may have the advantage of being able to sufficiently support the passenger's body as well as the console itself.

The console of embodiments of the present disclosure employs the structure of the frame 10, and thus, the assembly becomes easy, so it is possible to remove parts that are not required for the tuning for driving, and conversely, very easily mount various accessories. For example, equipments such as a camera 54 and a data logger 55 that are absolutely necessary while the vehicle is driving for racing may be easily mounted, so it is possible to solve the problem of having to damage the vehicle in order to install these equipments.

In addition, there is an advantage in that by allowing the console of embodiments of the present disclosure to employ the structure of the frame 10, there is no need to modify a mold for changing the mounting structure because the core part is unnecessary inside the console body 20, and by applying the joint adapter 15, the console body may be assembled to be supported by the frame 10 without welding. As a result, the effects such as the reduction in weight of the console, the reduction in costs, and the expansion of the degree of freedom of deformation may be exhibited.

In addition, since any other parts may be easily mounted on the frame 10, the console of embodiments of the present disclosure is also advantageous for customization services.

Figure 7:
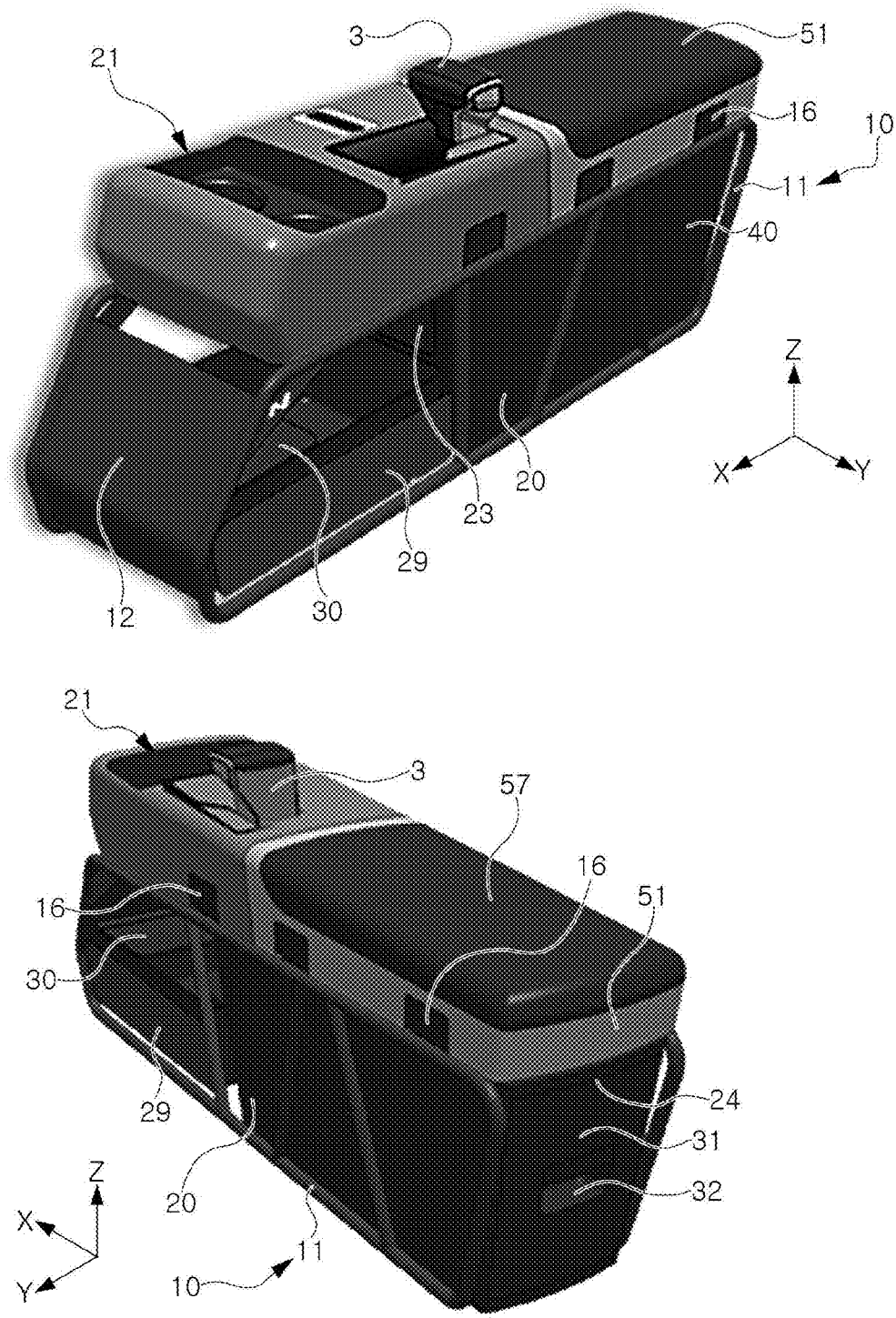
FIG. 7 is a perspective view illustrating a console for a vehicle according to a second exemplary embodiment in the present disclosure.
Figure 8:
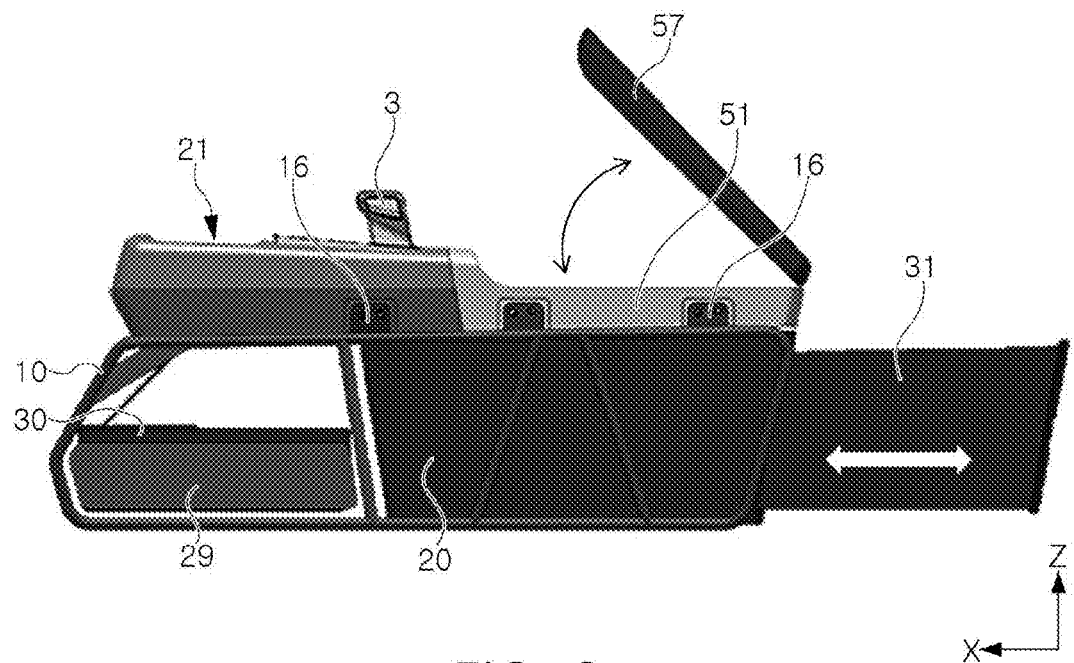
FIG. 8 is an operation state diagram of the console for a vehicle according to the second exemplary embodiment in the present disclosure.

FIG. 7 is a perspective view illustrating a console for a vehicle according to a second exemplary embodiment in the present disclosure, and FIG. 8 is an operation state diagram of the console for a vehicle according to the second exemplary embodiment in the present disclosure.

As illustrated in FIGS. 7 and 8, the console for a vehicle according to the second exemplary embodiment in the present disclosure may include a frame 10 and a console body 20.

The second exemplary embodiment in the present disclosure illustrated in FIGS. 7 and 8 is different only in that a shift lever 3 is disposed and a sliding tray 31 is added, and the remaining components are the same as those of the first exemplary embodiment illustrated in FIGS. 1 to 6. Therefore, in describing the console for a vehicle according to the second exemplary embodiment in the present disclosure, the same components as those of the console for a vehicle according to the first exemplary embodiment will be denoted by the same reference numerals, and a detailed description for configurations and functions of these components will be omitted.

The console body 20 may include a shift lever 3 together with a cup holder that is one of the article receiving parts 21.

The console body 20 may be formed of a solid material such as a metal such as steel, or plastic such as PA or PVC, but is not necessarily limited thereto.

The console body 20 may constitute a cover trim within the frame 10. The article receiving part 21 may further include a storage space formed within the cover trim, a so-called hidden tray 23.

As described above, by disposing the console body 20 in the space within the frame 10, the frame may be at least partially exposed externally of the console body.

For example, both sides of the console body 20 may be fixedly mounted to a mounting panel 16 provided on the frame 10. For example, a bolt hole may be formed in the mounting panel for bolting. These mounting panels may be provided with various accessories.

The console for a vehicle according to the second exemplary embodiment in the present disclosure may further include a tray 30 and a sliding tray 31 that may be received in or mounted on the frame 10.

The tray 30 may be mounted on or detachably coupled to a space on side of the frame 10. The tray may receive various articles by having a predetermined storage space therein. To this end, the tray may be formed in a substantially box shape whose upper surface is opened.

The sliding tray 31 may be provided in the console body 20 in the space on the other side of the frame 10. The sliding tray may be coupled to be accessed to a storage space of the console body through an opening 24 of the console body. The sliding tray may receive various articles by having a predetermined storage space therein. To this end, the sliding tray may be formed in a substantially box shape whose upper surface is opened.

Among the side surfaces of the sliding tray 31, for example, a rear surface facing the rear in the longitudinal direction of the console may be formed to have a shape corresponding to a shape of the opening 24 formed in the console body 20, so when the sliding tray fully enters the storage space, the rear surface may align with the rear surface of the console body, and at the same time, the shape of the rear surface may conform to the opening to close the opening.

In addition, a handle 32 may be formed or mounted on the rear surface of the sliding tray 31. A passenger may hold the handle and transmit force to slide the sliding tray within the storage space of the console body 20, and may enter the sliding tray into the storage space or advance out of the second storage space.

The sliding tray 31 may be provided with a slider or a rolling member movable along a rail (not illustrated) installed on an inner surface of the storage space. Accordingly, the sliding tray may move smoothly along the rail in the longitudinal direction of the console, that is, in the front-rear direction of the vehicle.

In addition, an arm rest 51 may be mounted on an upper surface of the console body 20 accommodating the sliding tray 31. In other words, the arm rest may be integrally formed with the console body.

Figure 9:
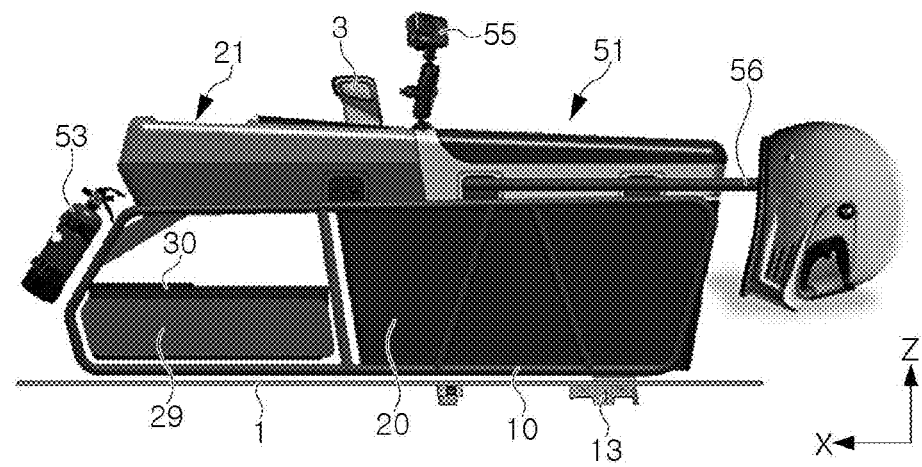
FIGS. 9 and 10 are diagrams illustrating an example in which accessories are mounted on the console for a vehicle according to the second exemplary embodiment in the present disclosure.
Figure 10:
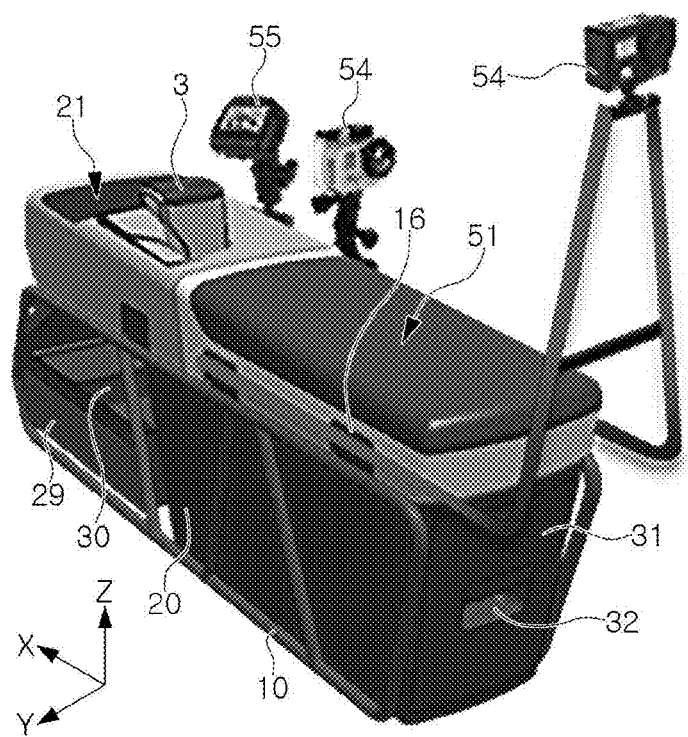

FIGS. 9 and 10 are diagrams illustrating an example in which accessories are mounted on the console for a vehicle according to the second exemplary embodiment in the present disclosure.

Accessories of the console for a vehicle may include an arm rest 51, a cushioning member 52, a fire extinguisher 53, a camera 54, a data logger 55, a helmet holder 56, and the like.

Here, the arm rest 51 may be integrally formed with the console body 20 as described above, and the storage space may be provided therein. For example, the cover 57 may be rotatably installed on an upper side of the arm rest, and the cover may open and close the storage space of the arm rest.

In addition, like the console body 20, both sides of the arm rest 51 may be fixedly mounted to the mounting panel 16 provided on the frame 10. For example, a bolt hole may be formed in the mounting panel for bolting. These mounting panels may be provided with various accessories.

The arm rest 51 may be integrally molded with the console body 20 or may be assembled together to be integrally coupled.

Figure 11:
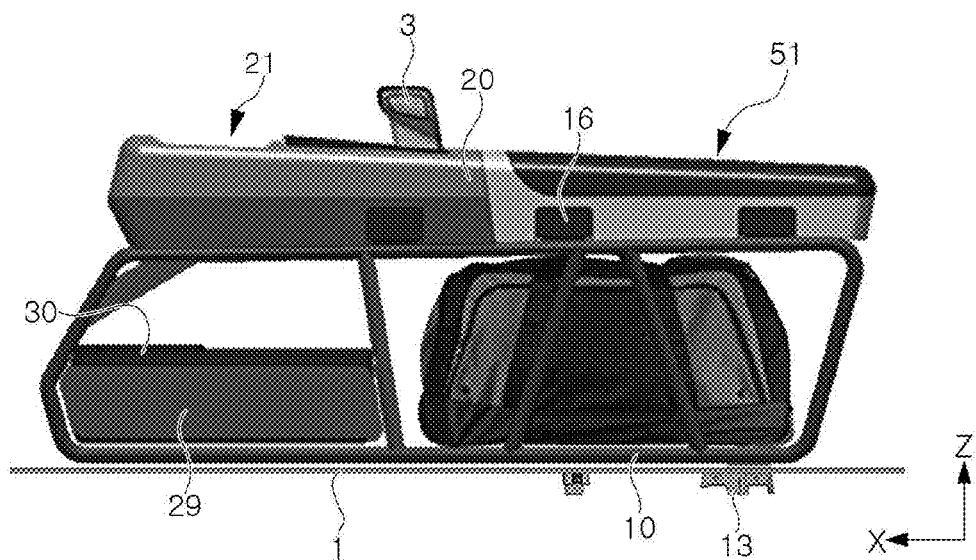
FIGS. 11 and 12 are diagrams illustrating a state in which some parts are removed from the console for a vehicle according to the second exemplary embodiment in the present disclosure.
Figure 12:
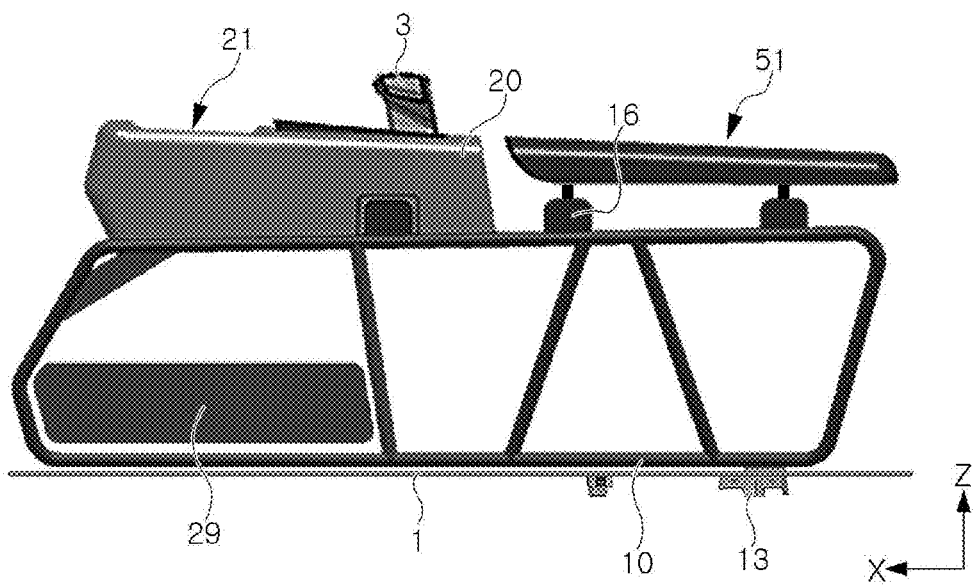

FIGS. 11 and 12 are diagrams illustrating a state in which some parts are removed from the console for a vehicle according to the second exemplary embodiment in the present disclosure.

For example. FIG. 11 illustrates a state in which the sliding tray is removed from the console for a vehicle according to the second exemplary embodiment in the present disclosure. At the same time, the cover trim constituting the sliding tray may also be removed.

In addition, it may be seen from FIG. 12 that not only the sliding tray but also the tray is removed. In this case, the arm rest 51 may be fixedly mounted to the mounting panel 16 provided on the frame 10 separately from the console body 20.

As described above, in the console for a vehicle according to the second exemplary embodiment in the present disclosure, by employing the structure of the frame 10, the assembly is convenient, and parts unnecessary for tuning for driving may be selectively removed, and conversely, various accessories may be very easily mounted.

Figure 13:
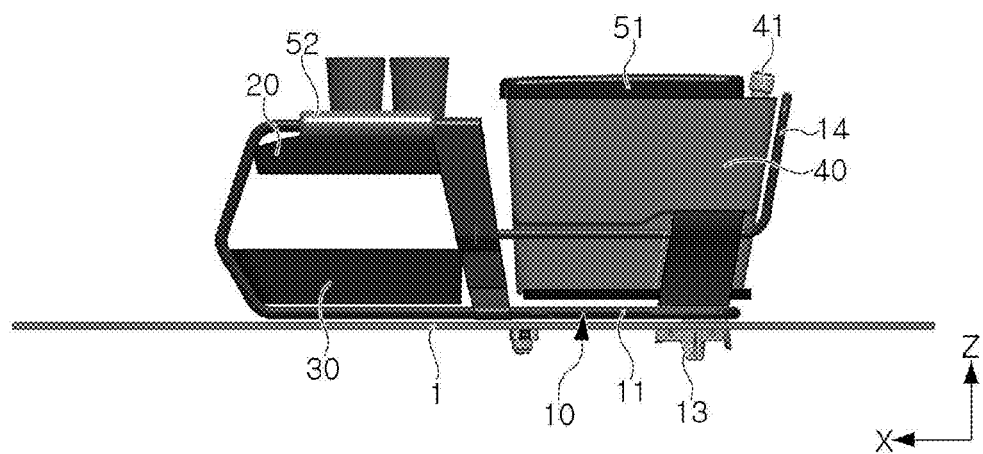
FIG. 13 is a side view illustrating a console for a vehicle according to a third exemplary embodiment in the present disclosure.
Figure 14:
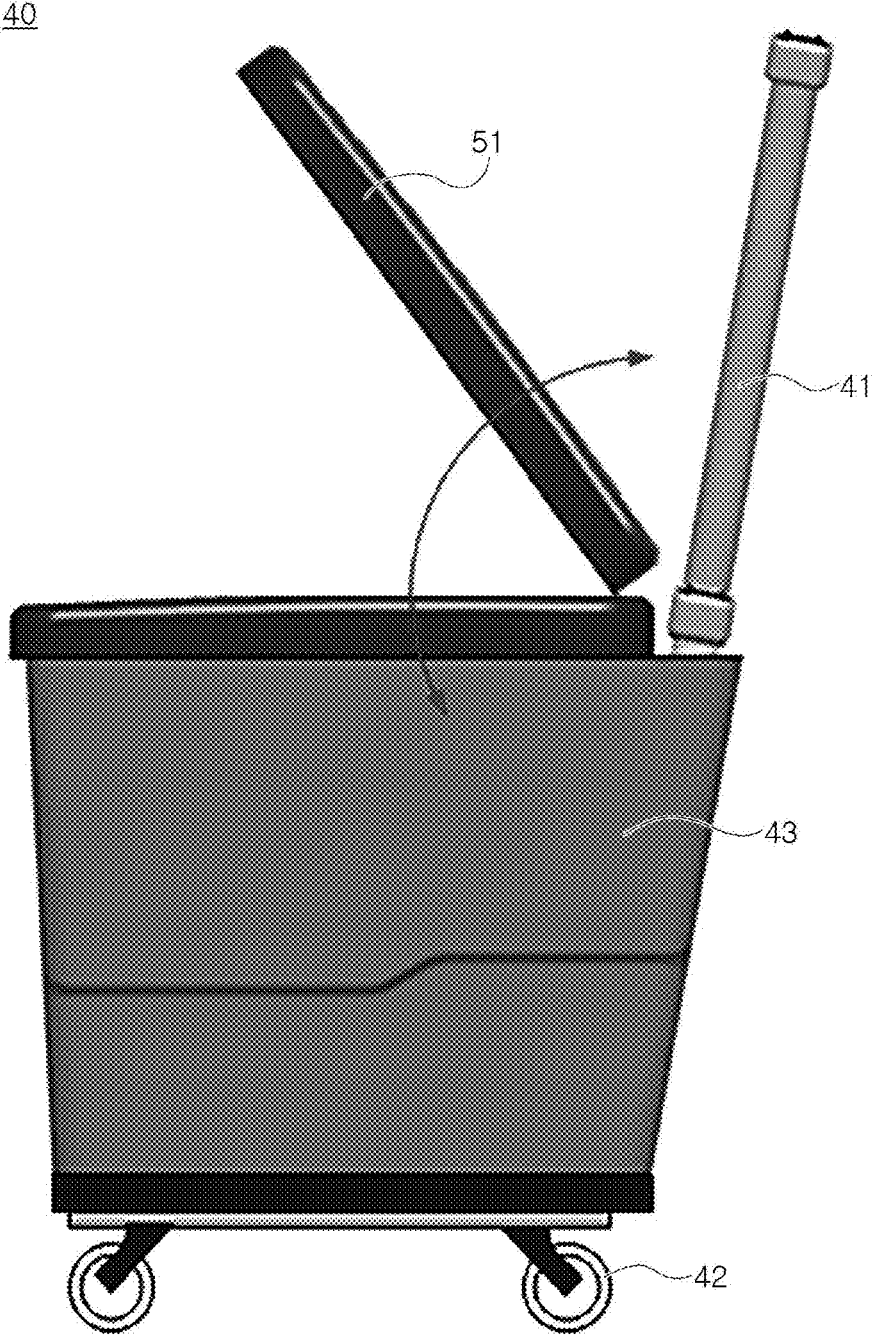
FIG. 14 is a diagram illustrating an example of use of a detachable carrier illustrated in FIG. 13.

FIG. 13 is a side view illustrating a console for a vehicle according to a third exemplary embodiment in the present disclosure, and FIG. 14 is a diagram illustrating an example of use of a carrier illustrated in FIG. 13.

As illustrated in FIGS. 13 and 14, the console for a vehicle according to the third exemplary embodiment in the present disclosure may include a frame 10 and a console body 20.

The third exemplary embodiment in the present disclosure illustrated in FIGS. 13 and 14 is different only in a structure of a detachable carrier 40, and the remaining components are the same as those of the first exemplary embodiment illustrated in FIGS. 1 to 6. Therefore, in describing the console for a vehicle according to the third exemplary embodiment in the present disclosure, the same components as those of the console for a vehicle according to the first exemplary embodiment will be denoted by the same reference numerals, and a detailed description for configurations and functions of these components will be omitted.

The console for a vehicle according to the third exemplary embodiment in the present disclosure may further include a tray 30 and a detachable carrier 40 that may be received in or mounted on the frame 10.

The tray 30 may be mounted on or detachably coupled to a space on side of the frame 10. The tray may receive various articles by having a predetermined storage space therein. To this end, the tray may be formed in a substantially box shape whose upper surface is opened.

In the case of the high-performance vehicle, the tray 30 may receive, for example, racing gloves or shoes.

The detachable carrier 40 may be mounted on or detachably coupled to the space on the other side of the frame 10. The detachable carrier may also have a predetermined storage space therein to receive various articles. Such a detachable carrier may be formed of a material such as metal, plastic, or fabric, and may be configured to be opened and closed.

The detachable carrier 40 may be seated in place in a space partitioned by the frame member 11 and the connection member 12 of the frame 10, and may be carried by a passenger outside a vehicle.

To this end, the detachable carrier 40 has a handle 41 that may be inserted into the carrier body 43 and whose length may be adjusted, and a plurality of wheels 42 that may be received in the carrier body and may be used to selectively protrude from the carrier body.

Here, since the handle 41 whose length may be adjusted, the receivable wheel 42, and the like are widely known technologies, in the present disclosure, detailed descriptions of the configuration and operating relationship of these handles and wheels will be omitted.

Accordingly, when the detachable carrier 40 is seated in the frame 10, the handle 41 and the wheels 42 may be drawn into and received in the carrier body 43, thereby minimizing bulk, preventing movement within the frame and preventing interference with the use of the console by passengers.

In the case of the high-performance vehicle, the detachable carrier 40 may receive, for example, various clothing required for racing, or safety device such as balaclava and hans.

In the console for a vehicle according to the third exemplary embodiment in the present disclosure, since the tray 30 and the detachable carrier 40 are not integrated with the frame 10 or the console body 20 but are detachable from the frame 10 or the console body 20, the tray 30 and the detachable carrier 40 may be easily attached and detached as needed, thereby having an effect of being selectively used.

In addition, an upper portion of the detachable carrier 40 may be provided with an arm rest 51. In other words, the arm rest may be integrally formed with the carrier body 43, a storage space may be provided inside the carrier body, and the arm rest may act as a door of the storage space.

For example, the arm rest 51 may be rotatably installed on the upper portion of the detachable carrier 40 to open and close the storage space of the carrier body 43.

As such, in the console for a vehicle according to the third exemplary embodiment in the present disclosure, there is an advantage of increasing the convenience of the detachable carrier 40.

Figure 15:
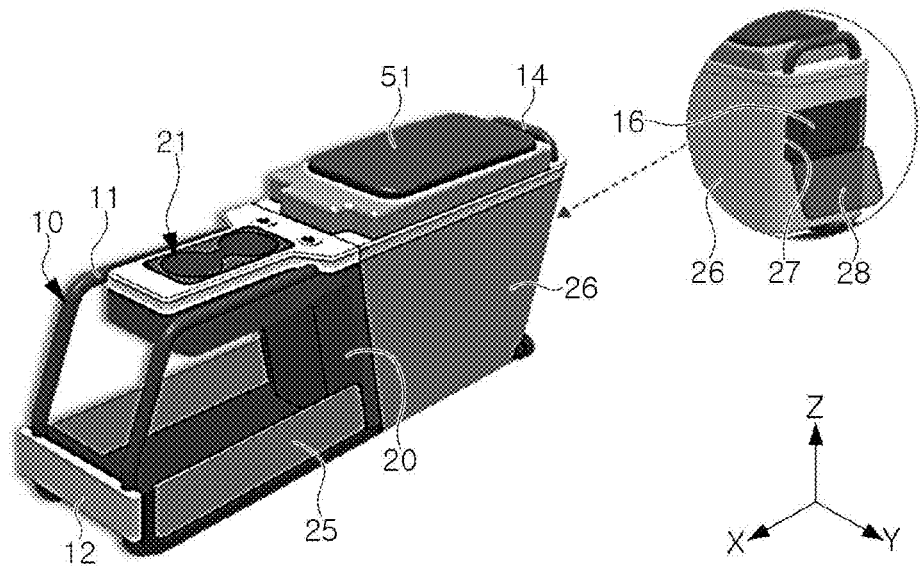
FIG. 15 is a perspective view illustrating a console for a vehicle according to a fourth exemplary embodiment in the present disclosure.
Figure 16:
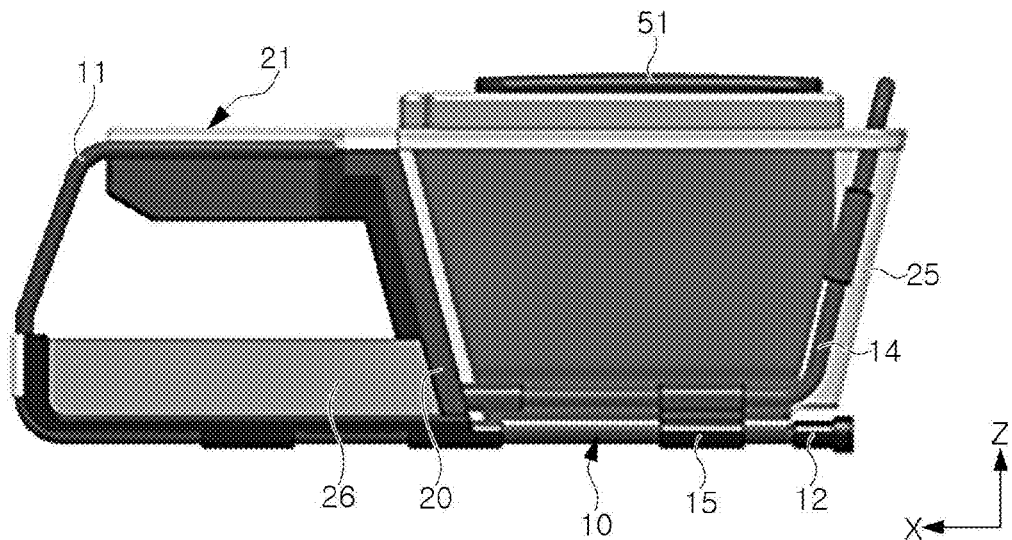
FIG. 16 is a projection view of a part of a console for a vehicle according to a fourth exemplary embodiment in the present disclosure.

FIG. 15 is a perspective view illustrating a console for a vehicle according to a fourth exemplary embodiment in the present disclosure, and FIG. 16 is a projection view of a part of the console for a vehicle according to the fourth exemplary embodiment in the present disclosure.

As illustrated in FIGS. 15 and 16, the console for a vehicle according to the fourth exemplary embodiment in the present disclosure may include a frame 10 and a console body 20.

The fourth exemplary embodiment in the present disclosure illustrated in FIGS. 15 and 16 is different only in that a plurality of fixed trays 25 and 26 are arranged, and the remaining components are the same as those of the first exemplary embodiment illustrated in FIGS. 1 to 6. Therefore, in describing the console for a vehicle according to the fourth exemplary embodiment in the present disclosure, the same components as those of the console for a vehicle according to the first exemplary embodiment will be denoted by the same reference numerals, and a detailed description for configurations and functions of these components will be omitted.

The console body 20 may be mounted on the frame 10 and may have at least one article receiving part 21, and may partition a space together with the frame if necessary. The console body may be integrally formed with a portion of the frame by insert injection molding with the frame member 11 or the like.

Alternatively, after the console body 20 is molded into two body members, these body members may be assembled to receive the frame member 11, and then the two body members may be joined by bolting, adhesive, welding, etc., so the console body may be integrally formed with a portion of the frame 10.

The console body 20 may be formed of a solid material such as a metal such as steel, or plastic such as PA or PVC, but is not necessarily limited thereto.

As described above, the console body 20 may be integrally formed with a portion of the frame 10, so the frame may be partially exposed externally of the console body.

Referring to FIGS. 15 and 16, the console body 20 may include a cup holder that is one of the articles receiving parts 21. In addition to the cup holder, the article receiving part of the console body 20 in the console for a vehicle according to the fourth exemplary embodiment in the present disclosure may further include a plurality of fixed trays 25 and 26 mounted on the frame 10.

The first fixed tray 25 may be fixedly coupled to one side of the frame 10, for example, in the front of the console in the longitudinal direction. The first fixed tray may have a predetermined storage space therein to receive various articles. To this end, the first fixed tray may be formed in a substantially box shape whose upper surface is opened.

The second fixed tray 26 may be fixedly coupled to the other side of the frame 10, for example, in the rear of the console in the longitudinal direction. The second fixed tray may have a predetermined storage space therein to receive various articles.

An arm rest 51 may be mounted on an upper portion of the second fixed tray 26. In other words, the arm rest may be integrally formed with the second fixed tray, and the arm rest may act as a door of the storage space in the second fixed tray.

For example, the arm rest 51 may be rotatably installed on the upper portion of the second fixed tray 26 to open and close the storage space of the second fixed tray.

Meanwhile, a rear surface of the second fixed tray 26 may be provided with a through-hole 27, and a cover member 28 for opening and closing the through-hole.

The mounting panel 16 of the frame 10 positioned in the second fixed tray 26 may be exposed externally through this through-hole 27. The mounting panel may be provided with an insertion hole or a bolt hole that may mount various accessories.

Figure 17:
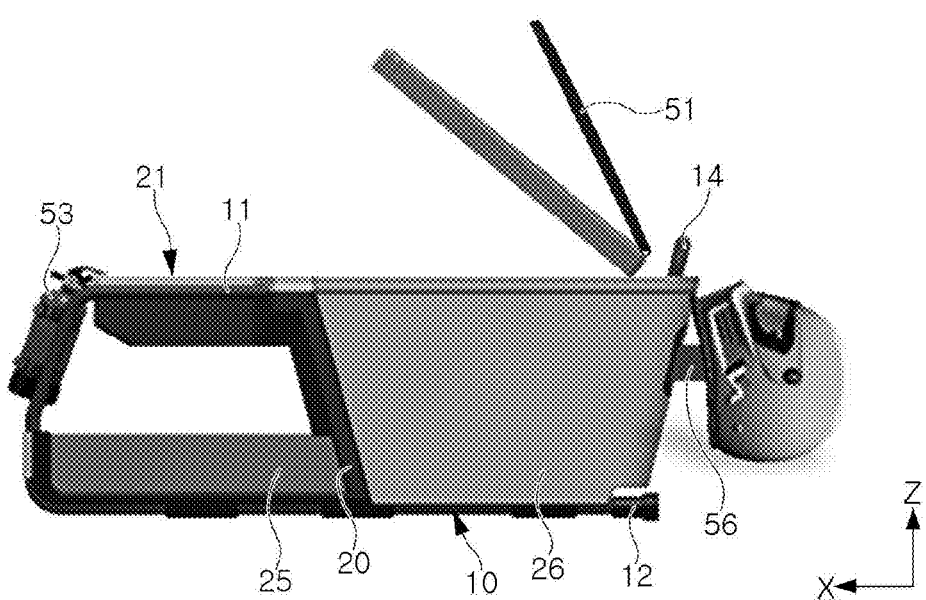
FIGS. 17 and 18 are diagrams illustrating an example in which accessories are mounted on the console for a vehicle according to the fourth exemplary embodiment in the present disclosure.
Figure 18:
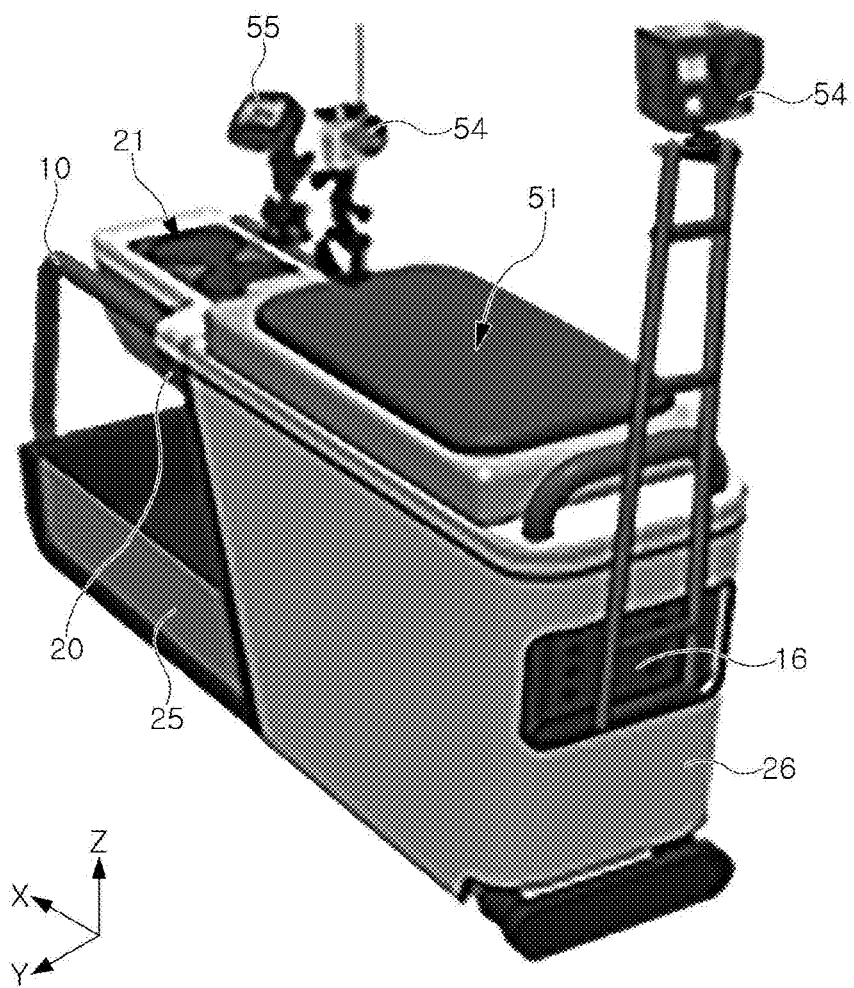

FIGS. 17 and 18 are diagrams illustrating an example in which accessories are mounted on the console for a vehicle according to the fourth exemplary embodiment in the present disclosure.

Accessories of the console for a vehicle may include a fire extinguisher 53, a camera 54, a data logger 55, a helmet holder 56, and the like.

As described above, in the console for a vehicle according to the fourth exemplary embodiment in the present disclosure, various accessories may be mounted very easily by partially exposing the frame 10 from the console body 20. In particular, it is possible to provide a holder, which may mount accessories such as a helmet and a camera, on the mounting panel 16 provided on the rear surface of the console body.

Furthermore, due to the structure in which the frame 10 is partially exposed from the console body 20, a separate core part, a mounting structure for the tray, and the like are unnecessary, so it is possible to obtain an effect of providing a large-capacity tray, reducing a weight of the console, reducing costs, and expanding the degree of freedom of deformation.

Figure 19:
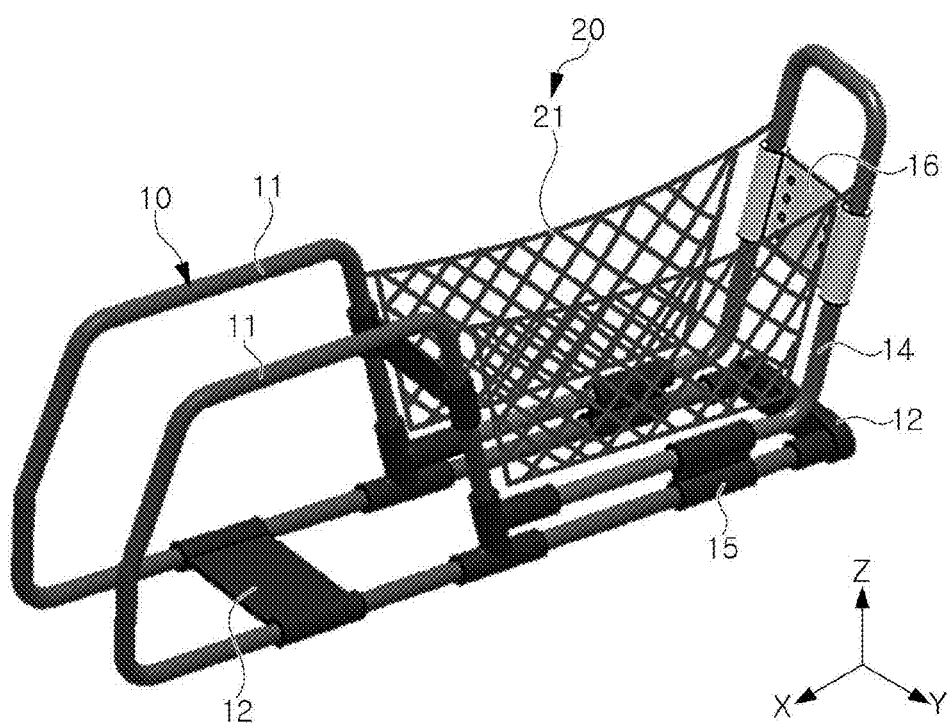
FIG. 19 is a perspective view illustrating a console for a vehicle according to a fifth exemplary embodiment in the present disclosure.

FIG. 19 is a perspective view illustrating a console for a vehicle according to a fifth exemplary embodiment in the present disclosure. As illustrated, the console for a vehicle according to the fifth exemplary embodiment in the present disclosure may include a frame 10 and a console body 20.

The fifth exemplary embodiment in the present disclosure illustrated in FIG. 19 is different only in a structure of the console body 20, and the remaining components are the same as those of the first exemplary embodiment illustrated in FIGS. 1 to 6. Therefore, in describing the console for a vehicle according to the fifth exemplary embodiment in the present disclosure, the same components as those of the console for a vehicle according to the first exemplary embodiment will be denoted by the same reference numerals, and a detailed description for configurations and functions of these components will be omitted.

The console body 20 may include a mesh acting as the article receiving part 21. This mesh may constitute the console body and may be disposed in the space within the frame 10, so the frame may be completely exposed externally of the console body.

As described above, in the console for a vehicle according to the fifth exemplary embodiment in the present disclosure, various accessories may be mounted very easily by fully exposing the frame 10 from the console body 20. In particular, there is an advantage in that the weight reduction and usability of the console may be maximized, and parts may be exchanged and replaced with parts for customized services if necessary.

As described above, according to the exemplary embodiments in the present disclosure, it is possible to provide the large storage space and various types of usability in, for example, the high-performance vehicle and reduce costs while securing the rigidity of the console and improving the aesthetic effect.

As set forth above, according to an exemplary embodiment in the present disclosure, it is possible to more strongly secure rigidity of a console since the console has a frame constituting an exoskeleton of the console.

In addition, according to an exemplary embodiment in the present disclosure, due to a frame constituting an exoskeleton of a console, there is no need for a separate core part for fixing components inside the console and imparting rigidity, thereby reducing a weight of the console, reducing costs, and expanding the degree of freedom of deformation.

Further, according to an exemplary embodiment in the present disclosure, it is possible to increase a storage space, and furthermore, it is possible to attach and detach a tray, a carrier, a bag, etc., and provide a large storage space and various types of usability by mounting various accessories such as a camera and a data logger.

Moreover, according to an exemplary embodiment in the present disclosure, a console has a design similar to a roll cage essential for, for example, a high-performance vehicle, so it is possible to obtain the effect of providing distinctive aesthetics.

The spirit of the present disclosure has been illustratively described hereinabove. It will be appreciated by those skilled in the art that various modifications and alterations may be made without departing from the essential characteristics of the present disclosure.

For example, the above and illustrated exemplary embodiments in the present disclosure may be combined with each other, and each exemplary embodiment may optionally employ some components of other exemplary embodiments as needed.

Accordingly, exemplary embodiments disclosed in the present disclosure and the drawings are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

What is claimed is:

1. A console for a vehicle, comprising:
   a frame installed on a floor of the vehicle; and
   a console body mounted on the frame and comprising at least one article receiving part,
   wherein the frame is at least partially exposed externally of the console body,
   wherein the article receiving part of the console body comprises a first fixed tray and a second fixed tray mounted on the frame,
   wherein one side surface of the second fixed tray is provided with a through-hole and a cover member for opening and closing the through-hole, and
   wherein a mounting panel of the frame positioned in the second fixing tray is exposed externally through the through-hole, and an accessory is mounted to the mounting panel.

2. The console of claim 1, wherein the frame comprises:
   a pair of frame members; and
   a connection member connecting the frame member,
   wherein the frame member comprises at least one closed cross-section.

3. The console of claim 1, wherein the frame comprises:
   a frame member integrally formed by being bent; and
   a connection member connecting both ends of the frame member.

4. The console of claim 1, wherein the frame is provided with a mounting bracket for connecting the frame to a vehicle body.

5. The console of claim 1, wherein the frame further comprises:
   an auxiliary frame member, and
   the auxiliary frame member is connected to the frame by a joint adapter.

6. The console of claim 5, wherein the auxiliary frame member is provided with the mounting panel for mounting the accessory.

7. The console of claim 5, wherein the auxiliary frame member is changeable in position on the frame.

8. The console of claim 5, wherein the auxiliary frame member is provided with a moving frame, and
   wherein the moving frame comprises
   a rail member fixed to the auxiliary frame member, and
   a slider sliding on the rail member.

9. The console of claim 1, wherein the accessory comprises at least one of a fire extinguisher, a camera, a data logger, and a helmet holder.

10. The console of claim 1, wherein the console body includes a shift lever.

11. The console of claim 1, wherein the console body is formed integrally with a portion of the frame.

12. The console of claim 11 wherein an arm rest is rotatably installed on an upper portion of the second fixing tray to open and close a storage space.

13. A vehicle comprising the console of claim 1.

* * * * *